(12) United States Patent
Yeckley

(10) Patent No.: US 8,318,622 B2
(45) Date of Patent: Nov. 27, 2012

(54) ALPHA-BETA SIALON BALLISTIC ARMOR CERAMIC AND METHOD FOR MAKING THE SAME

(75) Inventor: Russell L. Yeckley, Latrobe, PA (US)

(73) Assignee: Kennametal Inc., Latrobe, PA (US)

(*) Notice: Subject to any disclaimer, the term of this patent is extended or adjusted under 35 U.S.C. 154(b) by 411 days.

(21) Appl. No.: 12/652,876

(22) Filed: Jan. 6, 2010

(65) Prior Publication Data

US 2012/0190531 A1 Jul. 26, 2012

(51) Int. Cl.
*C04B 35/599* (2006.01)

(52) U.S. Cl. .............. 501/98.2; 501/98.3; 89/36.02

(58) Field of Classification Search .............. 501/98.2, 501/98.3; 89/36.02
See application file for complete search history.

(56) References Cited

U.S. PATENT DOCUMENTS

| | | | |
|---|---|---|---|
| 4,824,624 A | 4/1989 | Palicka et al. | |
| 5,227,346 A | 7/1993 | Hwang et al. | |
| 5,361,678 A | 11/1994 | Roopchand et al. | |
| 5,371,049 A | 12/1994 | Moffett et al. | |
| 5,443,917 A | 8/1995 | Tarry | |
| 5,763,813 A | 6/1998 | Cohen et al. | |
| 6,203,908 B1 | 3/2001 | Cohen | |
| 6,544,913 B2 | 4/2003 | Kim et al. | |
| 6,575,075 B2 | 6/2003 | Cohen | |
| 6,693,054 B1 | 2/2004 | Yeckley | |
| 6,709,736 B2 | 3/2004 | Gruber et al. | |
| 6,805,034 B1 | 10/2004 | McCormick et al. | |
| 6,964,933 B2 | 11/2005 | Yeckley | |
| 7,049,256 B2 | 5/2006 | Yeckley | |
| 7,064,095 B2* | 6/2006 | Mandal et al. | 501/98.2 |
| 7,104,177 B1 | 9/2006 | Aghajanian et al. | |
| 7,117,780 B2 | 10/2006 | Cohen | |
| 7,309,673 B2 | 12/2007 | Yeckley | |
| 7,855,159 B1* | 12/2010 | Yeckley | 501/98.2 |
| 2011/0266719 A1* | 11/2011 | Shen et al. | 264/430 |

FOREIGN PATENT DOCUMENTS

WO 2008100654 * 8/2008

OTHER PUBLICATIONS

Evans and Charles, "Fracture Toughness Determination by Indentation", J. Am. Ceramic Soc., vol. 59 Nos. 7-8, pp. 371-372 (1976).
Z. Mencik et al., "Quantitative Phase Analysis of Synthetic Silicon Nitride by X-Ray Diffraction", Advances in X-Ray Analysis, vol. 23, 1979 pp. 375-379.

* cited by examiner

*Primary Examiner* — Karl Group
(74) *Attorney, Agent, or Firm* — Matthew W. Smith, Esq.

(57) ABSTRACT

A SiAlON armor ceramic made from a starting powder mixture including silicon nitride powder. The armor ceramic includes a ceramic body that has between about 64 weight percent and about 90 weight percent alpha SiAlON phase that contains an alpha SiAlON-bound rare earth element. The ceramic body also has between about 5 weight percent and about 35 weight percent of a beta SiAlON phase of the formula $Si_{6-z}Al_zO_zN_{8-z}$ wherein the value of "z" ranges between about 0.10 and about 0.35. The alpha SiAlON-bound rare earth element in the alpha SiAlON phase is present as a result of the starting powder mixture that contains between about 1 weight percent and about 7 weight percent of an oxide of the alpha SiAlON-bound rare earth element. The ceramic body has a fracture toughness ($K_{IC}$) greater than about 6.00 MPa·m$^{1/2}$ and a Vickers hardness ($H_{VN}$) equal to greater than about 19.3 GPa.

17 Claims, 4 Drawing Sheets

ALPHA-BETA SIALON BALLISTIC ARMOR CERAMIC AND METHOD FOR MAKING THE SAME

GOVERNMENT RIGHTS

The United States Government has rights in this invention pursuant to Army Contract No. W911NF-04-2-0037 between the United States Department of the Army and Kennametal Inc.

BACKGROUND OF THE INVENTION

The present invention relates to ballistic armor ceramic. More specifically, the present invention pertains to ballistic armor ceramic made from an alpha-beta SiAlON ceramic material that exhibits excellent ballistic performance results, as well as provides other advantages over earlier armor ceramic materials. An alpha-beta SiAlON ceramic material contains an alpha SiAlON phase (which can also be referred to as an alpha-prime SiAlON phase or an $\alpha$-SiAlON phase or an $\alpha'$-SiAlON phase) and a beta SiAlON phase (which can also be referred to as an beta-prime SiAlON phase or an $\beta$-SiAlON phase or an $\beta'$-SiAlON phase). The alpha-beta SiAlON ceramic material may also contain optional intergranular phases such as a glassy phase (which is typically amorphous) and/or a crystalline phase.

Ballistic armor ceramic is intended to be worn by a user for protection, as well as for use in protecting light mobile equipment and vehicles, against high-speed firearm projectiles (e.g., bullets) and fragments (e.g., shrapnel). There are some main considerations concerning protective ballistic armor materials.

One consideration for protective ballistic armor is the weight of the armor. Protective armor for heavy, but mobile, military equipment (e.g., tanks and large ships), is known. Such armor usually comprises a thick layer of alloy steel that has the purpose to provide protection against heavy and explosive projectiles. Because of the large size of this equipment, the greater weight of the alloy steel kinds of armor is not a significant consideration for equipment such as tanks and ships. However, due to its greater weight, such armor is quite unsuitable for light vehicles such as automobiles, jeeps, light boats, or aircraft since armor of greater weight compromises performance. The same is true for body armor worn by a user. In this situation, heavy body armor is undesirable and impractical.

While specifications for body armor and armor for light vehicles may vary upon the specific application, armor suitable for these kinds of applications must prevent penetration of bullets of any weight at high speeds (e.g., speeds in the range of 700 to 3000 meters per second). Further, armor suitable for these kinds of applications must satisfy certain weight limitations (e.g., an armor weight that is acceptable for use on light vehicles varies with the type of vehicle, but generally falls in the range of 40 to 70 kg/m$^2$).

It can thus be appreciated that it would highly desirable to provide a ballistic armor, and especially a ballistic armor ceramic, that is able to satisfactorily prevent penetration of projectiles even when traveling at high speeds. It can also be appreciated that it would be highly desirable to provide such a ballistic armor ceramic that is sufficiently lightweight to not impede the performance of light vehicles or individuals in the case of ballistic ceramic body armor.

The cost of the material is another consideration concerning protective ballistic armor materials. In the case of overly complex armor arrangements, particularly those arrangements depending entirely on synthetic fibers, the armor arrangement comprises a notable proportion of the total vehicle cost. In such a situation, the result can be that manufacture of the vehicle is not profitable due to the cost of the ballistic armor component. It is an appreciation that it would be highly desirable to provide a ballistic armor, and especially a ballistic armor ceramic, that is affordable to make wherein the affordability of the armor results from one or both of the cost of materials and the cost of manufacture of the ballistic armor ceramic.

An additional consideration in armor design is compactness of the ballistic armor bodies or components. A thick armor panel, including air spaces between its various layers, increases the target profile of the vehicle, as well as increases the wind resistance of the vehicle. As can be appreciated, each one of these results is undesirable in that it makes the vehicle more susceptible to compromise to attack by an enemy. In the case of vehicles retrofitted with internal ballistic armor (e.g., civilian automobiles or even military vehicles needing more armor protection), there oftentimes is a lack of space to affix a thick panel to those areas that require protection. It can thus be appreciated that it would be highly desirable to provide a ballistic armor, and especially a ballistic armor ceramic, that presents a compact design so as to take up less space than heretofore thicker armor panels, and thus, be suitable to retrofit existing vehicles.

Heretofore, there have been alpha-beta SiAlON ceramic compositions that include rare earth elements. Although the compositions are different from the present inventive SiAlON ballistic armor ceramic, U.S. Pat. No. 7,309,673 for SIALON CERAMIC AND METHOD OF MAKING THE SAME to Yeckley and owned by Kennametal Inc. of Latrobe, Pa. 15650 discloses an alpha-beta SiAlON ceramic that contains ytterbium and lanthanum. The ceramic material of U.S. Pat. No. 7,309,673 is useful for cutting tool applications. U.S. Pat. No. 7,309,673 is incorporated by reference herein.

Heretofore, potential candidates for use as ballistic armor include ceramic materials. Silicon carbide and boron carbide are two especially suitable ceramic material candidates for ballistic armor ceramic. The following patents describe ballistic armor ceramic materials, as well as other kinds of armor ceramic materials. U.S. Pat. No. 6,805,034 B1 to McCormick et al. pertains to a silicon carbide armor body. U.S. Pat. No. 7,104,177 B1 to Ahajanian et al. discloses a ceramic-rich composite armor. U.S. Pat. No. 7,117,780 to Cohen discloses a composite armor plate.

Further, an earlier co-pending patent application, which is U.S. patent application Ser. No. 11/652,314 filed Jan. 11, 2007 for ALPHA-BETA SIALON BALLISTIC ARMOR CERAMIC by Russell L. Yeckley (and assigned to Kennametal Inc.), which is incorporated herein by reference, pertains to an alpha-beta SiAlON armor ceramic. This patent application discloses specific examples of ballistic armor ceramic. Although the compositions are different from the present inventive SiAlON ballistic armor ceramic, a co-pending U.S. Ser. No. 11/652,314 filed on Jan. 11, 2007 for ALPHA-BETA SIALON BALLISTIC ARMOR CERAMIC by Russell L. Yeckley (and assigned to Kennametal Inc.) discloses a ballistic armor ceramic that comprises alpha-beta SiAlON. In the specific examples, the ceramics include two rare earth elements. One rare earth element is bound to the alpha-SiAlON phase and another rare earth element is not bound to the alpha SiAlON phase. This earlier patent application (i.e., U.S. Ser. No. 11/652,314) discloses two basic starting powder mixtures used to make the alpha-beta SiAlON ceramic material. One starting powder mixture contains the following powders: silicon nitride, aluminum nitride, aluminum oxide, ytterbium oxide, and lanthanum oxide. The other starting powder mixture contains the same components as the first starting powder mixture, but further includes silicon carbide.

Still referring to the specific examples in U.S. Ser. No. 11/652,314, the silicon nitride is present in an amount between about 70.45 weight percent and 83.65 weight percent of the starting powder mixture. The aluminum nitride powder is present in an amount between about 5.95 weight percent and 11.91 weight percent of the starting powder mixture. The aluminum oxide powder is present in an amount between about 1.00 weight percent and 6.95 weight percent of the starting powder mixture. The ytterbium oxide powder is present in an amount between about 8.14 weight percent and 9.95 weight percent of the starting powder mixture. The lanthanum oxide powder is present in an amount between about 0.50 weight percent and 0.77 weight percent of the starting powder mixture. When present, the silicon carbide powder is present in an amount between about 5.00 weight percent and 15.00 weight percent of the starting powder mixture.

Still referring to the specific examples in U.S. Ser. No. 11/652,314, the alpha SiAlON content ranges between about 60.9 weight percent and about 95.4 weight percent of the ceramic body. The beta SiAlON phase content ranges between about 4.6 and about 39.1 weight percent of the ceramic body. The Vickers hardness ranges between about 17.770 and about 20.62. The fracture toughness ($K_{IC}$) ranges between about 6.500 and about 7.730.

In the specific examples of ballistic armor ceramic in a co-pending U.S. Ser. No. 11/652,314 filed on Jan. 11, 2007 for ALPHA-BETA SIALON BALLISTIC ARMOR CERAMIC by Russell L. Yeckley (and assigned to Kennametal Inc.), the value of "z" ranges between about 0.36 and about 0.96. More specifically, Table A below sets forth the starting powder compositions and the "z" values for Batches Nos. 2833A through 2833D in the co-pending U.S. Ser. No. 11/652,314.

TABLE A

Starting Powder Mixtures (in weight percent of the total starting powder mixture) of the Batches Nos. 2833A through 2833 D and the "z" Value from U.S. Ser. No. 11/652,314

| Batch No. | Silicon Nitride | Aluminum Nitride | Alumina | Ytterbia | Lathina | "z" Value |
|---|---|---|---|---|---|---|
| 2833A | 83.65 | 5.95 | 1.49 | 8.14 | 0.77 | .36 |
| 2833B | 76.21 | 9.82 | 3.27 | 9.92 | 0.77 | .64 |
| 2833C | 77.60 | 9.33 | 4.17 | 8.14 | 0.77 | .72 |
| 2833D | 70.45 | 11.91 | 6.95 | 9.92 | 0.77 | .96 |

Physical properties of the ballistic armor ceramic are important to satisfactory performance. These physical properties include the hardness, the fracture toughness and the density of the ceramic material. One goal is to achieve a ballistic armor ceramic with a proper combination of the hardness, the fracture toughness and the density to attain satisfactory performance.

Although current ballistic armor ceramic materials may provide satisfactory performance results, there remains a need to provide an improved ballistic armor ceramic whereby such armor addresses the above-mentioned design considerations for ballistic armor. In this regard, the improved ballistic ceramic would be able to satisfactorily prevent penetration of projectiles even when traveling at high speeds, as well as be sufficiently lightweight so as to not impede the performance of light vehicles or individuals in the case of ballistic ceramic body armor.

Further, such improved ballistic armor ceramic would be affordable to make wherein the affordability of the armor results from one or both of the cost of materials and the cost of manufacture of the ballistic armor ceramic. In reference to the method of manufacturing, such improved ballistic armor ceramic would provide the capability to be made into more complex shapes or geometries than heretofore available. This would be due to the ability to make the ceramic by methods (e.g., sinter-HIP techniques) that allow for more flexibility than earlier methods (e.g., hot pressing techniques).

In addition, such improved ballistic armor ceramic would present a compact design so as to take up less space than heretofore thicker armor panels, and thus, be suitable to retrofit existing vehicles. The capability to make ballistic armor ceramic of more complex shapes facilitates activities like the retrofitting of existing vehicles.

SUMMARY OF THE INVENTION

In one form thereof, the invention is a SiAlON armor ceramic made from a starting powder mixture including silicon nitride powder. The armor ceramic includes a ceramic body that has between about 64 weight percent and about 90 weight percent alpha SiAlON phase that contains an alpha SiAlON-bound rare earth element. The ceramic body also has between about 5 weight percent and about 35 weight percent of a beta SiAlON phase of the formula $Si_{6-z}Al_zO_zN_{8-z}$ wherein the value of "z" ranges between about 0.10 and about 0.35. The alpha SiAlON-bound rare earth element in the alpha SiAlON phase is present as a result of the starting powder mixture that contains between about 1 weight percent and about 7 weight percent of an oxide of the alpha SiAlON-bound rare earth element. The ceramic body has a fracture toughness ($K_{IC}$) greater than about 6.00 MPa·m$^{1/2}$ and a Vickers hardness ($H_{VN}$) equal to greater than about 19.3 GPa.

In another form thereof, the invention is a SiAlON armor ceramic, which comprises a ceramic body. The ceramic body comprises an alpha SiAlON phase, which contains an alpha SiAlON-bound rare earth element, and a beta SiAlON phase of the formula $Si_{6-z}Al_zO_zN_{8-z}$ wherein the value of "z" ranges between about 0.10 and about 0.35. The ceramic body is made from a starting powder mixture comprising between about 85 weight percent and about 92 weight percent silicon nitride, between about 3 weight percent and about 8 weight percent aluminum nitride, between about 1 weight percent and about 7 weight percent of an oxide of the alpha SiAlON-bound rare earth element. The ceramic body has a fracture toughness ($K_{IC}$) greater than about 6.00 MPa·m$^{1/2}$ and a Vickers hardness ($H_{VN}$) equal to greater than about 19.3 GPa.

In yet another form thereof, the invention is a method of making a SiAlON armor ceramic comprising the steps of: providing a starting powder mixture comprising between about 85 weight percent and about 92 weight percent silicon nitride, between about 3 weight percent and about 8 weight percent aluminum nitride, between about 1 weight percent and about 7 weight percent of an oxide of an alpha SiAlON-bound rare earth element; and pressing the starting powder mixture into a green compact; and consolidating the green compact into a consolidated ceramic body comprising an alpha SiAlON phase, which contains the alpha SiAlON-bound rare earth element, and a beta SiAlON phase of the formula $Si_{6-z}Al_zO_zN_{8-z}$ wherein the value of "z" ranges between about 0.10 and about 0.35, and wherein the consolidated ceramic body having a fracture toughness ($K_{IC}$) greater than about 6.00 MPa·m$^{1/2}$ and a Vickers hardness (H$_{VN}$) equal to greater than about 19.3 GPa.

BRIEF DESCRIPTION OF THE DRAWINGS

The following is a brief description of the drawings that form a part of this patent application.

DETAILED DESCRIPTION

Figure 1:
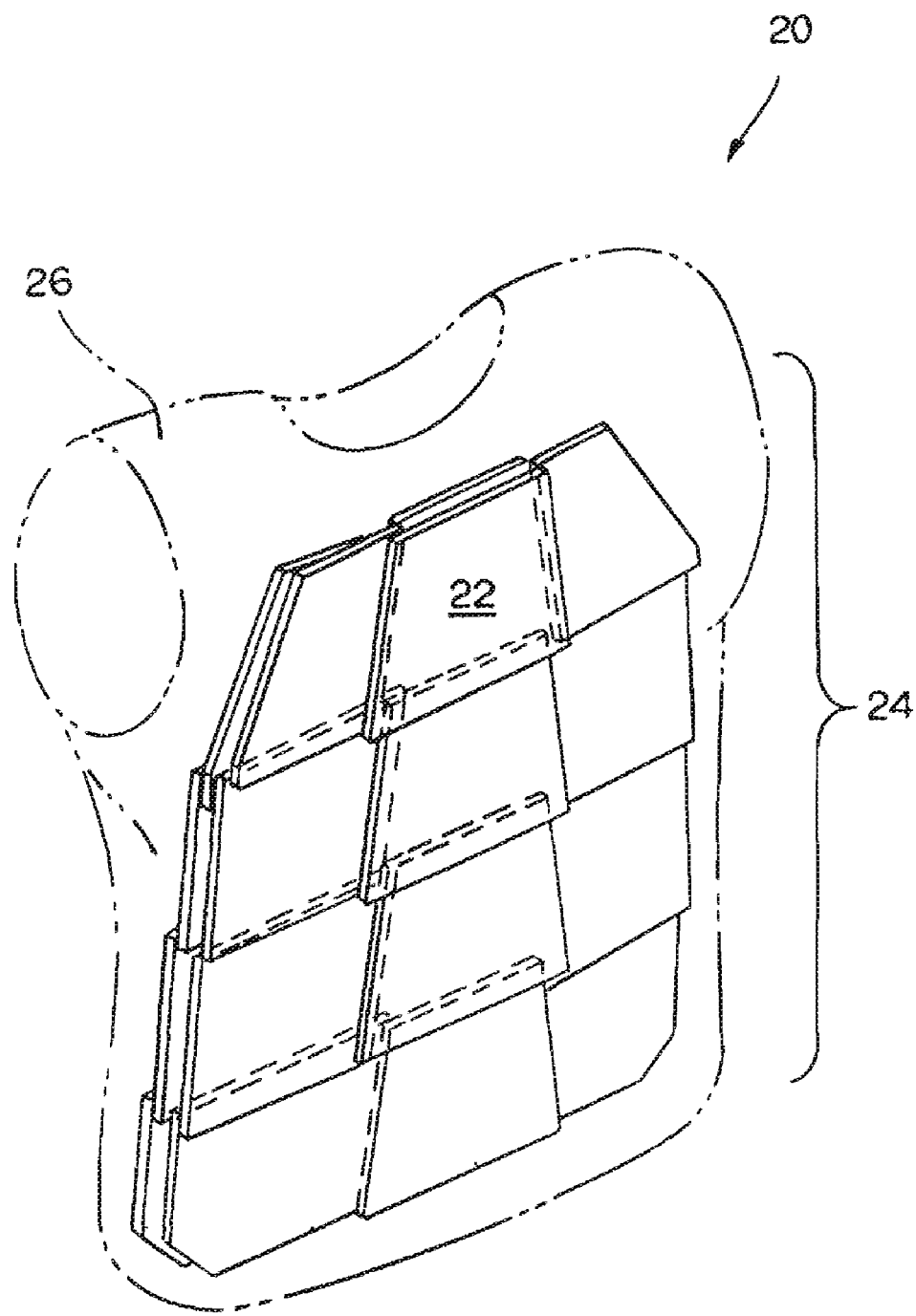
FIG. 1 is an isometric view of an exemplary article of ballistic ceramic armor that comprises a plurality of panels joined together so as to be worn by the user.

FIG. 1 is an isometric view of an exemplary article of ballistic ceramic armor generally designated as 20. Ballistic ceramic armor 20 comprises a plurality of ceramic panels 22 joined to form a protective region (see bracket 24). The protective region 24 attaches to a garment or article 26 worn by the user.

The present invention is an inventive ballistic armor ceramic that satisfies the criteria for ballistic armor materials, as well as addresses drawbacks that exist with current ballistic armor ceramic materials. The present inventive ballistic armor ceramic satisfactorily prevents penetration of projectiles even when traveling at high speeds. This includes the satisfactory prevention of multiple hits of projectiles. To provide properties that allow the ceramic material to resist penetration, the present inventive ballistic armor ceramic exhibits a favorable combination of properties of hardness, fracture toughness and density. This combination of these properties results in the present inventive ballistic armor ceramic that satisfactorily resists penetration of projectiles including multiple hits of projectiles.

Generally speaking, an alpha-beta SiAlON ceramic material with a finer grain size will exhibit a higher hardness. Since the alpha SiAlON phase exhibits equi-axed grains, the grain size typically becomes finer with an increase in the content of the alpha SiAlON phase in an alpha-beta SiAlON ceramic material. Thus, there is a desire to provide an alpha-beta SiAlON ballistic armor ceramic that has a high content of the alpha SiAlON phase to exhibit a higher hardness.

Further, the presence of crystalline intergranular phases typically reduces the fracture toughness of an alpha-beta SiAlON ceramic material. The ability to maintain an intergranular liquid phase during the sintering cycle typically results in a reduction in the content of crystalline intergranular phases. Thus, there is the desire to maintain the intergranular liquid phase during the sintering cycle to result in an alpha-beta SiAlON ballistic armor ceramic that has greater fracture toughness.

In reference to the density of the alpha-beta SiAlON ballistic armor, the density of the alpha-beta SiAlON ballistic armor is higher than the density of silicon carbide used as ballistic armor, as well as higher than the density of boron carbide used as ballistic armor. Thus, there is the desire to process the starting powder mixture to achieve an alpha-beta SiAlON ballistic armor ceramic with a lower density.

The present inventive ballistic armor ceramic has a number of other advantages. First, it is sufficiently lightweight. It is light enough to form a part of a lightweight vehicle and not detract from the vehicle performance. It is light enough for an individual to wear and not impair performance.

In addition, the present inventive ballistic armor ceramic is also affordable to make wherein the affordability of the ballistic armor results from one or both of the cost of materials and the cost of manufacture of the inventive ballistic armor ceramic. In this regard, the present inventive ballistic armor ceramic provides the capability for manufacture into more complex shapes or geometries than heretofore available. This would be due to the ability to make the ceramic by methods (e.g., sinter-HIP techniques) that allow for more flexibility than earlier methods (e.g., hot pressing techniques).

The present inventive ballistic armor ceramic also presents a compact design. Such a compact design takes up less space than earlier thicker armor panels, and thus, the present ballistic armor ceramic is very suitable to retrofit existing vehicles.

The present invention is a ballistic armor ceramic made from an alpha-beta SiAlON ceramic material that includes an alpha SiAlON phase and a beta SiAlON phase. Further, the alpha-beta SiAlON ceramic material typically may include intergranular phases such as, for example, a glassy phase and/or a crystalline phase.

In regard to the alpha-SiAlON phase of the present alpha-beta SiAlON inventive ballistic armor ceramic, the alpha SiAlON phase may be of the formula RE$_x$Si$_{12-(m+n)}$Al$_{m+n}$O$_n$N$_{16-n}$ where RE is a rare earth element, i.e., the alpha SiAlON-bound rare earth element, such as, for example yttrium (Y) or ytterbium (Yb). Some of the specific examples of the inventive alpha-beta SiAlON ballistic armor ceramic used yttrium as the alpha-SiAlON bound rare earth element, and others of the examples of the inventive alpha-beta SiAlON ballistic armor ceramic used ytterbium as the alpha-SiAlON bound rare earth element. Since the element "RE" is a part of the alpha SiAlON phase, one can consider this element to be an alpha SiAlON-bound rare earth element. The alpha SiAlON phase comprises generally equi-axed grains.

In regard to the beta SiAlON phase of the present alpha-beta SiAlON inventive ballistic armor ceramic, this phase may be of the formula $Si_{6-z}Al_zO_zN_{8-z}$ where one expects the value of "z" to range between about 0.10 and about 0.35. More preferably, one expects the value of "z" to range between about 0.15 and about 0.30. Even more preferably, one expects the value of "z" to range between about 0.20 and about 0.25. Further, in some instances, one could expect the value of "z" to range between about 0.10 and about 0.20, as well as the value of "z" to range between about 0.20 and about 0.35. In the present invention, one preferred value of "z" is about 0.26. The beta SiAlON phase comprises generally elongated grains. As one can appreciate, the "z" values of the present ballistic armor ceramic are lower than the "z" values for the ballistic armor ceramic in co-pending Ser. No. 11/652,314 filed on Jan. 11, 2007.

The present inventive alpha-beta SiAlON ballistic armor ceramic as disclosed herein can also contain one or more additional phases including an intergranular phase. The intergranular phase may comprise a glassy phase and an intergranular crystalline phase may sometimes be present. The glassy phase is typically an amorphous phase that contains the rare earth elements, silicon, oxygen, aluminum and nitrogen. When the alpha-SiAlON bound rare earth element is yttrium, the following intergranular phases may be present: YAG (yttrium aluminum garnet) which is a cubic phase of the formula $Y_3Al_5O_{12}$), and J-phase which has the formula $Y_4Si_{2-x}Al_xO_{7+x}N_{2-x}$ wherein x ranges from 0 to 2, and $(Y_4Si_{0.67}Al_{1.3})_{8.33}N_{0.67}$. When the alpha SiAlON-bound rare earth additive is ytterbium, the intergranular crystalline phases that may be present are: YbAG (ytterbium aluminum garnet) which is a cubic phase of the formula $Yb_3Al_5O_{12}$), and J-phase which has the formula $Yb_4Si_{2-x}Al_xO_{7+x}N_{2-x}$ wherein x ranges from 0 to 2, and $(Yb_4Si_{0.67}Al_{1.3})_{8.33}N_{0.67}$.

Specific examples of the inventive alpha-beta SiAlON ballistic armor ceramic are set forth below. In Inventive Batches Nos. 18305A through 18305C, the starting powder mixture includes magnesium oxide, which is a non-binding liquid phase-forming additive that does not enter the alpha-SiAlON structure during sintering. The alpha SiAlON-bound rare earth element is yttrium (Y). In Inventive Batches Nos. 18695A through 18695C and 19282A, the starting powder mixture includes magnesium oxide, which is a non-binding liquid phase-forming additive that does not enter the alpha-SiAlON structure during sintering. The alpha SiAlON-bound rare earth element is ytterbium (Yb). There is no intention that these specific examples unduly restrict the scope of the present invention. There is the intention that certain modifications and variations to the specific examples remain within the scope of the invention.

There is the contemplation that the inventive alpha-beta SiAlON ballistic armor ceramic may use rare earth elements that comprises the "RE" in the formula for the alpha-SiAlON phase (i.e., an alpha-SiAlON bound rare earth element) other than yttrium or ytterbium in the formula $RE_xSi_{12-(m+n)}Al_{m+n}O_nN_{16-n}$. These other rare earth elements include praseodymium (Pr), neodymium (Nd,) promethium (Pm), samarium (Sm), europium (Eu), gadolinium (Gd), terbium (Tb), dysprosium (Dy), holmium (Ho), erbium (Er), thulium (Tm), and lutetium (Lu).

There is the contemplation that the inventive alpha-beta SiAlON ballistic armor ceramic may use a non-binding liquid phase-forming additive other than magnesium in the form of magnesium oxide. What is meant by a non-binding liquid phase forming additive is an additive that contains an element that does not bind with or become a part of the alpha SiAlON phase. Other exemplary unbound elements, which are not rare earth elements, include barium in the form of barium oxide (BaO), magnesium oxide (MgO), strontium in the form of strontium oxide (SrO) and scandium in the form of scandium oxide ($Sc_2O_3$). There is the contemplation that the starting powder mixture may contain an unbound rare earth element, which is a rare earth element that does not bind with the alpha SiAlON phase (an alpha-SiAlON unbound rare earth element). In the context of the alpha-beta SiAlON ceramic material, there is the contemplation that lanthanum (La) and cerium (Ce) could function as an alpha-SiAlON unbound rare earth element.

In the specific examples, during the sintering process, essentially no effective portion (i.e., essentially no detectable amount) of the non-binding liquid phase-forming additive (i.e., magnesium oxide) forms a part of the alpha prime SiAlON phase (or the beta prime SiAlON phase) so that the liquid phase is maintained throughout the sintering process. More specifically, as shown by its formula (i.e., formula $Si_{6-z}Al_zO_zN_{8-z}$), the beta SiAlON phase does not contain any non-binding liquid phase-forming additive(s). In the case of the specific examples herein, essentially no detectable amount of the non-binding liquid phase-forming additive(s) (i.e., magnesium oxide) is present in the alpha SiAlON phase. This means that an analysis of grains of the alpha SiAlON phase that have a diameter greater than or equal to about 2 micrometers using an EDS (energy dispersive spectroscopy)/SEM (scanning electron microscopy) technique does not detect the presence of any of magnesium.

Described below are some examples of the present invention. The examples discussed below, i.e., Inventive Batches Nos. 18305A through 18305C, comprise a SiAlON ceramic material that contains yttrium and magnesium wherein this means that the starting powder mixture for the specific examples set forth in Table 1 contain one oxide of an alpha SiAlON-bound rare earth element (i.e., yttrium) and one oxide of an unbound element (i.e., magnesium), which is a non-binding liquid-phase forming additive. In reference to Inventive Batches Nos. 18695A through 18305C and 19282A, these ceramics comprise a SiAlON ceramic material that contains ytterbium and magnesium wherein this means that the starting powder mixture for the specific examples set forth in Table 8 contain one oxide of an alpha SiAlON-bound rare earth element (i.e., ytterbium) and one oxide of an unbound element (i.e., magnesium), which is a non-binding liquid-phase forming additive.

The starting silicon nitride powder for these examples (i.e., Batches 18305A through 18305C, 18695A through 18305C and 19282A) does not contain any beta silicon nitride. However, there is no intention to restrict the scope of the invention because the examples use a silicon nitride starting powder that does not contain any beta-silicon nitride. In the other words, the starting silicon nitride powder comprises essentially one hundred weight percent alpha silicon nitride, except for impurities. There is the contemplation that the starting silicon nitride powder can have a beta silicon nitride content greater than zero. In one alternative, the beta-silicon nitride content of the silicon nitride powder can have a lower limit equal to zero weight percent and an upper limit equal to about 1.6 weight percent of the silicon nitride powder, which means a minimum content of alpha silicon nitride equal to about 98.4 weight percent. In another alternative, the beta-silicon nitride content of the silicon nitride powder can have a lower limit equal to zero weight percent and an upper limit equal to about 3 weight percent of the silicon nitride powder, which means a minimum content of alpha silicon nitride equal to about 97 weight percent.

Specific examples of the inventive ballistic armor ceramic comprise Batches Nos. 18305A through 18305C as set forth below. These specific examples comprise three different starting powder compositions (in weight percent) as set out in Table 1. Table 2 presents the particle size properties for the ball milled starting powder mixture.

TABLE 1

Starting Powder Mixtures (in weight percent of the total starting powder mixture) of Inventive Batches Nos. 18305A through 18305C of the Inventive SiAlON Ceramic

| Inventive Batch No. | Silicon Nitride | Aluminum Nitride | Magnesia (MgO) | Yttria |
|---|---|---|---|---|
| 18305A | 90.55 | 4.75 | 1.00 | 3.70 |
| 18305B | 89.80 | 5.50 | 1.00 | 3.70 |
| 18305C | 89.05 | 6.25 | 1.00 | 3.70 |

The starting powders are briefly described as follows. These starting powders were in Batches Nos. 18305A through 18305 C, Batches Nos. 17667A through 17667D, Batches Nos. 18695A through 18695C, and Batch No. 19828A.

Except for the silicon nitride powder in Batches Nos. 17667C and 17667D as explained hereinafter, the silicon nitride powder is from UBE Industries, Ltd., Tokyo, Japan, and sold under the designation SNE03. This SNE03 silicon nitride powder did not contain any beta silicon nitride, but instead, comprised about one hundred percent alpha silicon nitride, except for impurities. The aluminum nitride starting powder was supplied by Herman C. Starck of New York, N.Y. (United States of America) under the designation Grade A. The ytterbium oxide starting powder and the lanthanum oxide starting powder were supplied by Molycorp Corporation of Mountain Pass, Calif. (United States of America). The yttria (i.e., yttrium oxide) powder and the magnesia (magnesium oxide) powder were supplied from Fisher Scientific, 2000 Park Lane Drive, Pittsburgh, Pa. 15275.

For each one of Inventive Batch Nos. 18305A through 18305C set out in Table 1, the starting powder composition was milled for a time of between about 8 hours and about 16 hours with isopropanol and using an alpha' SiAlON-beta' SiAlON media to form a slurry. After completion of the milling, the slurry was discharged through a 400 mesh screen and then vacuum dried to form a dry powder. The dry powder was then fitzmilled and pellitized using a fluid bed process. Rosin and Carbowax 400 were added as binders during the fluidization process. The pellitized material (dry powder and the binder material) was then dry pressed into green compacts of partial density wherein this density ranged between about 2 to about 2.15 grams per cubic centimeter. The binder was then removed by an air burnout cycle that had a maximum temperature of about 875 degrees Fahrenheit.

TABLE 2

Particle Size Properties for the Ball Milled Starting Powder Mixtures (in weight percent) of the Inventive Batches Nos. 18305A through 18305C of the Inventive SiAlON Ceramic

| Inventive Batch No. | BET | O2 | PSD 0.1 | PSD 0.5 | PSD 0.9 |
|---|---|---|---|---|---|
| 18305A | 5.01 | 2.06 | 0.45 | 0.83 | 1.47 |
| 18305B | 4.87 | 2.10 | 0.43 | 0.81 | 1.46 |
| 18305C | 5.00 | 1.98 | 0.44 | 0.81 | 1.42 |

For Table 2, the data set forth therein comprises the following properties: (a) the average surface area of the particles was measured by the BET (Brunauer, Emmet and Teller) method and reported in square meters per gram ($m^2/gm$); (b) the oxygen content of the particles is reported in weight percent of the particle mixture, and is measured via a Leco Oxygen Analyzer; (c) the particle size distribution (i.e., PSD 0.1, PSD 0.5 and PSD 0.9) is reported in microns. It should be appreciated that the particle size data set forth in Table 2 refers to the ball milled components after 16 hours of ball milling.

Samples from Inventive Batches No. 18305A through 18305C were sintered via the PS434 sintering cycle. The PS434 sintering cycle comprised placing compacts in a graphite box wherein the compacts were buried in an 80 weight percent silicon nitride-20 weight percent boron nitride powder mixture. The compacts were sintered under a pressure equal to 75 to 100 psi in a nitrogen atmosphere for 60 minutes. During this 60 minutes the temperature was 1840 C for 30 minutes and then ramped to 1900 C. The pressure was then increased to 1500 psi using argon gas and soaked (held) for 30 minutes under this pressure (1500 psi) and temperature.

Samples from Inventive Batches Nos. 18305A through 18305C were sintered per the PS443 sintering cycle. In reference to the PS443 sintering cycle, the green compact were buried in a 50 weight percent boron nitride-50 weight percent silicon nitride setting powder containing about 0.5 weight percent alumina. The compacts were sintered under a pressure equal to 75 to 100 psi in a nitrogen atmosphere for 60 minutes. The pressure was then increased to 1500 psi using argon gas and soaked (held) for 30 minutes under this pressure (1500 psi). The soak temperature was held constant at 1840° C. for the 90 minutes.

Table 3 sets forth the phases present and the physical properties for each of the examples. The Vickers hardness (Hvn) was measured using a 18.5 kilogram load and is set forth in gigapacals (GPa). The fracture toughness ($K_{IC}$) was measured on a polished surface employing a Palmqvist indentation technique using a 18.5 kg load on a Vickers indentor per the article by Evans and Charles, "Fracture Toughness Determination by Indentation", J. American Ceramic Society, Vol. 59, Nos. 7-8, pages 371-372 and reported in MPa·$m^{1/2}$. The Knoop hardness ($H_{kn}$) was measured using a 2 Kg load and reported in kg/$mm^2$. As set forth in Table 3, the weight percent of the alpha prime SiAlON phase and the beta prime SiAlON phase is of the total of the alpha SiAlON phase and the beta SiAlON phase.

TABLE 3

Selected Physical Properties of Ceramic Bodies of Inventive Batches 18305A through 18305C of the SiAlON Ceramic as Sintering Cycle PS434 and PS443

| Inventive Batch No./ Sintering Cycle | Percent alpha SiAlON phase | Percent beta SiAlON phase | Vickers Hardness GPa/Std. Dev. | Fracture Toughness ($K_{IC}$) MPa · $m^{1/2}$/Std. Dev. | $H_{kn}$ (2 kg load kg/ $mm^2$)/ Std. Dev. | Density (g/cc) |
|---|---|---|---|---|---|---|
| 18305A/PS434 | 66.8 | 30.5 | 19.63/0.61 | 6.71/0.29 | 1652/24 | 3.222 |
| 18305B/PS434 | 80.2 | 18.3 | 20.65/0.44 | 7.03/0.98 | 1689/19 | 3.228 |
| 18305C/PS434 | 76.2 | 22.2 | 20.10/0.27 | 6.63/0.51 | 1687/37 | 3.228 |
| 18305A/PS443 | 79.5 | 19.5 | 20.05/0.79 | 6.20/0.44 | 1672/39 | 3.227 |
| 18305B/PS443 | 83.4 | 15.5 | 20.13/0.24 | 6.32/0.19 | 1705/29 | 3.227 |
| 18305C/PS443 | 87.7 | 11.2 | 20.66/0.20 | 6.55/0.37 | 1765/34 | 3.225 |

In regard to the determination of the weight percent of alpha'-SiAlON phase (the term alpha SiAlON phase can be interchangeably with alpha-SiAlON phase herein), the weight percent of the alpha'-SiAlON phase is determined by Rietveld refinement method.

The diffraction patterns were collected using Bragg-Brentano focusing optics diffractometer operated at 45 KV and 40 MA. Incident x-ray optics includes a ½ degree divergence slit and 1-degree anti-scatter slit. Receiving optics included a 0.15 mm receiving slit; a curved graphite monochrometer, and a sealed detector. Diffraction data was collected from 10 to 90 degrees 2θ in step mode and analyzed using computerized methods.

In regard to the determination of the relative intensity of the $Yb_4SiAlO_8N$ crystalline phase and the $SiAl_5O$ crystalline phase, the relative intensity of the $Yb_4SiAlO_8N$ crystalline phase and the $SiAl_5O$ crystalline phase is calculated from the following:

Relative Intensity of the $Yb_4SiAlO_8N$
Phase=$I_{Yb4SiAlO8N} \div I_{Highest}$ Relative Intensity of the $SiAl_5O$
Phase=$I_{SiAl5O} \div I_{Highest}$ For the above relationships, the following exists:

$I_{Yb4SiAlO8N}$=measured x-ray diffraction intensity of the (211) reflection of $Yb_4SiAlO_8N$ $I_{SiAl5O}$=measured x-ray diffraction intensity of the (201) reflection of $SiAl_5O$ $I_{Highest}$=measured x-ray intensity of highest peak detected (typically beta'-SiAlON)

The diffraction setup was identical to the diffraction setup to determine the weight percent of alpha'-SiAlON and beta'-SiAlON.

TABLE 4

Values of "z" for the beta SiAlON Phase of Inventive Batches Nos. 18305A through 18305C

| Batch No./ Sintering Cycle | "z" value for beta SiAlON Phase ($Si_{6-z}Al_zO_zN_{8-z}$) |
|---|---|
| 18305A PS434 | 0.24 |
| 18305B PS434 | 0.28 |
| 18305C PS434 | 0.22 |
| 18305A PS443 | 0.28 |
| 18305B PS434 | 0.26 |
| 18305C PS434 | 0.28 |

In reference to Table 4, the value of "z" for the beta SiAlON phase was determined using the following formulas for "$z_a$", "$z_c$", and "$z_{c/a}$":

$z_a = a - 7.60442/0.3$ $z_c = c - 2.90751/0/027$ $z_{c/a} = (c/a - 0.38226)/0/002$

In the above formulas, the value "a" is the "a" unit cell dimension in the beta SiAlON phase and the value "c" is the "c" unit cell dimension in the beta SiAlON phase. These formulas are set forth in U.S. Pat. No. 7,049,256 to Yeckley at Column 17, wherein the patent is hereby incorporated by reference herein. The "z" value set forth in Table 4, which is the "z" value for the beta SiAlON phase of the formula ($Si_{6-z}Al_zO_zN_{8-z}$), is the average of the above three "z" values, i.e., $z_a$, $z_c$, and $z_{c/a}$.

As discussed hereinabove, there exists an advantage to provide the alpha-beta SiAlON ballistic armor ceramic with a higher alpha SiAlON phase content. The present inventive alpha-beta SiAlON ballistic armor ceramic uses two ways to result in a higher alpha SiAlON phase content. First, when the liquid phase exists through the sintering cycle, the amount of alpha SiAlON phase that forms typically increases. Second, a higher content of alpha SiAlON phase exists in the alpha-beta SiAlON ceramic when the silicon nitride starting powder has a low beta silicon nitride content.

An increase in the content of crystalline phases in the grain boundaries can result in a reduction of the fracture toughness of the SiAlON material. Hence, it would be desirable (or at least preferable) to provide a SiAlON material that has a minimal amount of the crystalline phase(s) that have formed in the grain boundaries.

The densification of the alpha-beta SiAlON ceramic becomes greater the longer the liquid phase remains in the liquid state. Thus, in order to improve the densification of the alpha-beta SiAlON ceramic, it would be advantageous to use additives that form a liquid phase at a relatively lower temperature.

It is an option, and generally speaking a preferable although not mandatory option, in regard to the formation of the alpha SiAlON phase to use additive(s) that would form and maintain an intergranular liquid phase upon sintering and throughout the sintering cycle. One can consider this kind of additive as a non-binding liquid phase-forming additive. A typical non-binding liquid phase-forming additive is an oxide that contains an element that does not bind with the alpha SiAlON phase. Such an element could be an unbound element (e.g., magnesium (Mg)) that does not bind with the alpha SiAlON phase. Other exemplary unbound elements, which are not rare earth elements, include barium in the form of barium oxide (BaO), magnesium oxide (MgO), strontium in the form of strontium oxide (SrO) and scandium in the form of scandium oxide ($Sc_2O_3$). As mentioned hereinabove, the unbound element could also be an unbound rare earth element that even though a rare earth, does not bind with the alpha SiAlON phase. In the context of the alpha-beta SiAlON ceramic material, lanthanum (La) and cerium (Ce) function an unbound rare earth elements. Lanthanum (La) and cerium (Ce) would be expected to form and maintain an intergranular liquid phase upon sintering and throughout the sintering cycle.

Still referring to a non-binding liquid phase-forming additive, to be unbound to the alpha SiAlON phase, essentially none of the non-binding liquid phase-forming additive(s) would become a part of the alpha SiAlON phase. In other words, there would be essentially no detectable amount of the non-binding liquid phase-forming additive (the unbound element and/or the unbound rare earth element) in the alpha SiAlON phase. If one does not detect the presence of such non-binding liquid phase-forming additives in the sufficiently large grains of the alpha prime SiAlON phase (i.e., on the order of greater than or equal to about 2 micrometers in diameter) through the use of energy dispersive spectrum-scanning electron microscopy (EDS/SEM) techniques, then there is essentially no detectable amount of the non-binding liquid phase-forming additive.

The result of the absence of any detectable amount of non-binding liquid phase-forming additive in the alpha SiAlON phase would be that the liquid phase would be maintained through the sintering cycle. By maintaining the liquid phase during the sintering cycle, the amount of alpha SiAlON phase that would be formed increases. Set forth below is the understanding of why the alpha SiAlON content of such a SiAlON ceramic body can be controlled (at least to some extent). However, there is no intention to be restricted by or bound to the following discussion about the following understanding.

There is the belief that other additives that form a silicate liquid phase upon and through sintering, but do not form a part of the alpha prime SiAlON phase (i.e., non-binding additives), should also provide an advantageous result along the lines of the results provided by the lanthanum addition. Exemplary non-binding additives comprise barium oxide (BaO), magnesium oxide (MgO), strontium oxide (SrO) and scandium oxide ($Sc_2O_3$). These non-binding additives are good densification additives and they do not enter into the alpha-SiAlON phase. These non-binding additives are added in amounts that range from a lower limit that equals about 0.1 weight percent of the starting powder mixture to an upper limit that equals about 2.0 weight percent of the starting powder mixture. Another range for these non-binding additives would be amounts that range from a lower limit that equals about 0.1 weight percent of the starting powder mixture to an upper limit that equals about 1.0 weight percent of the starting powder mixture. In this aspect of the invention, the starting powder mixture includes an additive that forms a silicate liquid phase upon sintering wherein the additive does not form a part of the alpha prime SiAlON phase, i.e., a non-binding liquid phase-forming additive. The continued presence of the liquid phase enhances the formation of the alpha SiAlON phase to result in a SiAlON ceramic that has an increased content of the alpha SiAlON phase.

In this aspect of the invention, if more than one rare earth element is a part of the starting powder mixture, there is a preference that one of the rare earth elements (e.g., lanthanum or cerium, which can be considered to be a non-binding liquid phase-forming rare earth element (or an unbound rare earth element)) forms a liquid phase during and through the sintering process. The liquid phase-forming rare earth element does not form a part of the alpha prime SiAlON phase so that there is essentially no detectable amount of the non-binding liquid phase-forming rare earth element (unbound rare earth element) in the alpha prime SiAlON phase. Through an x-ray diffraction technique, in the formula for alpha SiAlON phase (i.e., $RE_xSi_{12-(m+n)}Al_{m+n}O_nN_{16-n}$ where RE is a rare earth element) the value of x in the alpha prime SiAlON phase is equal to between a lower limit equal to about 0.10 and an upper limit equal to about 0.45. The value of m equals three times the value of x. The alpha SiAlON phase comprises generally equi-axed grains. Even though the above discussion mentions two rare earth elements, it should be appreciated that three of more rare earth elements may be-included in the starting powder mixture to produce the SiAlON ceramic body.

There is no intention to be restricted by the following theory thought to be at work in this invention. There is the belief that the advantages are obtained through the above selection parameters because the two or more rare earth elements will not form a solid solution. The ionic radii of the elements decrease across the series of rare earth elements, and as the difference between the ionic radius of the rare earth elements becomes greater these elements have an increased tendency to not enter the same crystalline structure. What this means is that during densification and cooling from the sintering temperature, the crystallizations rates are slowed down because the rare earth elements are attempting to crystallize in the intergranular regions.

As mentioned hereinabove, higher alpha SiAlON phase contents exist when the starting silicon nitride powder has a lower content of beta-silicon nitride. Along this line, it is much preferred that the starting powder mixture include a low beta content silicon nitride starting powder. The beta-silicon nitride content in a low beta content silicon nitride powder is no greater than about 3 weight percent beta silicon nitride, which means that the starting silicon nitride powder has a minimum alpha silicon nitride content equal to about 97 weight percent. More preferably, the starting silicon nitride powder has a beta silicon nitride content with an upper limit equal to about 1.6 weight percent, which means that the minimum alpha silicon nitride content is about 98.4 weight percent. Most preferably, the starting silicon nitride powder contains zero weight percent beta silicon nitride, which means that the starting silicon nitride powder is about 100 weight percent alpha silicon nitride.

The amount of beta silicon nitride in the starting powder mixture may be controlled in one of two ways. One way is to blend predetermined amounts of two or more silicon nitride powders wherein the alpha and beta contents of each powder is known so as to achieve a silicon nitride powder of a known beta content. The other way is to take 100 percent alpha silicon nitride powder and add a selected amount of 100 percent beta silicon nitride powder to it to achieve a silicon nitride powder of a known beta content. This latter way facilitates control of the particle size of the beta silicon nitride component.

In this regard, there is no intention to be restricted by any particular theory, applicant believes that the beta silicon nitride particles are seeds for the nucleation and growth of the beta SiAlON grains. As the number of the beta silicon nitride particles increase the beta SiAlON grains impinge each other sooner so as to limit the formation of high aspect ratio beta SiAlON grains. In addition, as the number of the beta silicon nitride particles increases the content of the alpha SiAlON grains decreases. The use of fewer beta silicon nitride particles in the starting powder mixture results in a limited number of nucleation sites for the beta SiAlON grains to grow into the alpha SiAlON matrix during sintering. This results in beta SiAlON grains with a higher aspect ratio which causes a toughening of the alpha SiAlON phase matrix. This explanation is also found in U.S. Pat. No. 6,693,054 to Yeckley that is assigned to the assignee of the present patent application.

The analysis below shows the impact of the beta-silicon nitride phase content in the starting silicon nitride powder. In this regard, it is clear that the use of a silicon nitride powder, which has a lower beta silicon nitride content, in the starting powder results in a ceramic with better properties. The UBE silicon nitride powder has a beta-silicon nitride content of about zero and most certainly less than 1.0 weight percent. The VESTA silicon nitride powder has a beta-silicon nitride content equal to about 7.0 weight percent.

For each one of Inventive Batch Nos. 17667A through 17667D set out in Table 5, the starting powder composition was milled for a time of between about 8 hours and about 16 hours with isopropanol and using an alpha' SiAlON-beta' SiAlON media to form a slurry. After completion of the milling, the slurry was discharged through a 400 mesh screen and then vacuum dried to form a dry powder. The dry powder was then fitzmilled and pellitized using a fluid bed process. Rosin and Carbowax 400 were added as binders during the fluidization process. The pellitized material (dry powder and the binder material) was then dry pressed into green compacts of partial density wherein this density ranged between about 2 to about 2.15 grams per cubic centimeter. The binder was then removed by an air burnout cycle that had a maximum temperature of about 875 degrees Fahrenheit.

TABLE 5

Starting Powder Mixtures (in weight percent of the total starting powder mixture) of Batch Nos. 17667A-17667D of SiAlON Ceramic

| Batch No. | Silicon Nitride (UBE) | Silicon Nitride (VESTA) | Aluminum Nitride | Ytterbia | Yttria |
|---|---|---|---|---|---|
| 17667A | 91.30 | — | 4.00 | — | 4.70 |
| 17667B | 88.80 | — | 4.00 | 8.20 | — |
| 17667C | — | 91.30 | 4.00 | — | 4.70 |
| 17667D | — | 88.80 | 4.00 | 8.20 | — |

TABLE 6

Particle Size Properties for the Ball Milled Starting Powder Mixtures (in weight percent) of the Batch Nos. 17667A-17667D of the SiAlON Ceramic

| Batch No. | BET | O2 | PSD 0.1 | PSD 0.5 | PSD 0.9 |
|---|---|---|---|---|---|
| 17667A | 4.56 | 2.19% | 0.42 | 0.80 | 1.48 |
| 17667B | 4.95 | 1.79% | 0.41 | 0.79 | 1.45 |
| 17667C | 9.56 | 2.16% | 0.27 | 0.76 | 1.88 |
| 17667D | 8.91 | 2.10% | 0.28 | 0.80 | 2.00 |

For Table 6, the data set forth therein comprises the following properties: (a) the average surface area of the particles was measured by the BET (Brunauer, Emmet and Teller) method and reported in square meters per gram ($m^2/gm$); (b) the oxygen content of the particles is reported in weight percent of the particle mixture, and is measured via a Leco Oxygen Analyzer; (c) the particle size distribution (i.e., PSD 0.1, PSD 0.5 and PSD 0.9) is reported in microns. It should be appreciated that the particle size data set forth in Table 6 refers to the ball milled components after 23 hours of ball milling.

Samples from Inventive Batches No. 17667A through 17667D were sintered via pressure sintering. The pressure sintering cycle comprised placing compacts in a graphite box wherein the compacts were buried in an 80 weight percent silicon nitride-20 weight percent boron nitride powder mixture. The compacts were sintered under a pressure equal to 75 to 100 psi in a nitrogen atmosphere for 60 minutes. The pressure was then increased to 1500 psi using argon gas and soaked (held) for 30 minutes under this pressure (1500 psi). The soak temperature was 1840 C.

Table 7 sets forth the phases present and the physical properties for each of the examples. The Vickers hardness (Hvn) was measured using a 18.5 kilogram load and is set forth in gigapacals (GPa). The fracture toughness ($K_{IC}$) was measured on a polished surface employing a Palmqvist indentation technique using a 18.5 kg load on a Vickers indentor per the article by Evans and Charles, "Fracture Toughness Determination by Indentation", J. American Ceramic Society, Vol. 59, Nos. 7-8, pages 371-372 and reported in MPa·$m^{1/2}$. The Knoop hardness ($H_{kn}$) was measured using a 2 Kg load and reported in kg/$mm^2$. As set forth in Table 3, the weight percent of the alpha prime SiAlON phase and the beta prime SiAlON phase is of the total of the alpha SiAlON phase and the beta SiAlON phase.

TABLE 7

Selected Physical Properties of Ceramic Bodies of Batch Nos. 17667A-17667D of SiAlON Ceramic

| Batch No. | Percent alpha SiAlON phase | Percent beta SiAlON phase | Vickers Hardness GPa/Std. Dev. | Fracture Toughness ($K_{IC}$) MPa·$m^{1/2}$/Std. Dev. | $H_{kn}$ (2 kg load kg/$mm^2$)/Std. Dev. | Wt. Change (%) | Density (g/cc) |
|---|---|---|---|---|---|---|---|
| 17667A | 64.3 | 30.1 | 19.35/0.60 | 6.83/0.13 | 1642/40 | −0.07 | 3.24 |
| 17667B | 69.1 | 30 | 19.20/0.11 | 6.72/0.26 | 1654/34 | −0.65 | 3.354 |
| 17667C | 18 | 75 | 16.53/0.26 | 6.09/0.13 | 1520/43 | −0.08 | 3.239 |
| 17667D | 28.5 | 70.9 | 16.76/0.28 | 6.07/0.19 | 1510/18 | −0.33 | 3.357 |

FIGS. 2 through 5 are photomicrographs of the ceramics set forth in Table 7. A discussion of each photomicrograph, along with the results in Table 7 is set forth below. This discussion also takes into account the powder composition of Table 5.

Figure 2:
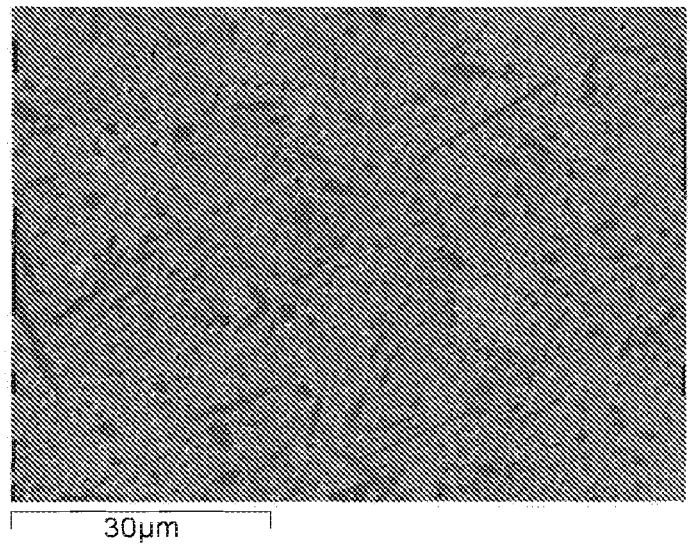
FIG. 2 is a photomicrograph that is a backscatter image taken via scanning electron microscopy (with a scale of 30 micrometers) of the ceramic Batch No. 17667A wherein the white phase is the rare earth alumina silicate grain boundary phase, the medium gray phase are grains of the alpha SiAlON phase, and dark regions comprise the beta SiAlON phase.

FIG. 2 is a photomicrograph that is a backscatter image taken via scanning electron microscopy (with a scale of 30 micrometers) of the ceramic Batch No. 17667A. The white phase is the rare earth alumina silicate grain boundary phase, the medium gray phase are grains of the alpha SiAlON phase, and dark regions comprise the beta SiAlON phase.

Figure 3:
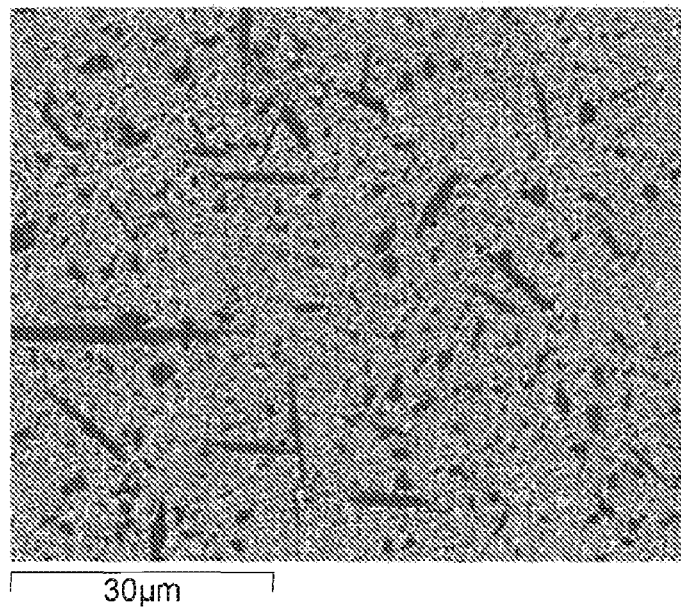
FIG. 3 is a photomicrograph that is a backscatter image taken via scanning electron microscopy (with a scale of 30 micrometers) of the ceramic Batch No. 17667B wherein the white phase is the rare earth alumina silicate grain boundary phase, the medium gray phase are grains of the alpha SiAlON phase, and dark regions comprise the beta SiAlON phase.

FIG. 3 is a photomicrograph that is a backscatter image taken via scanning electron microscopy (with a scale of 30 micrometers) of the ceramic Batch No. 17667B. The white phase is the rare earth alumina silicate grain boundary phase, the medium gray phase are grains of the alpha SiAlON phase, and dark regions comprise the beta SiAlON phase.

Figure 4:
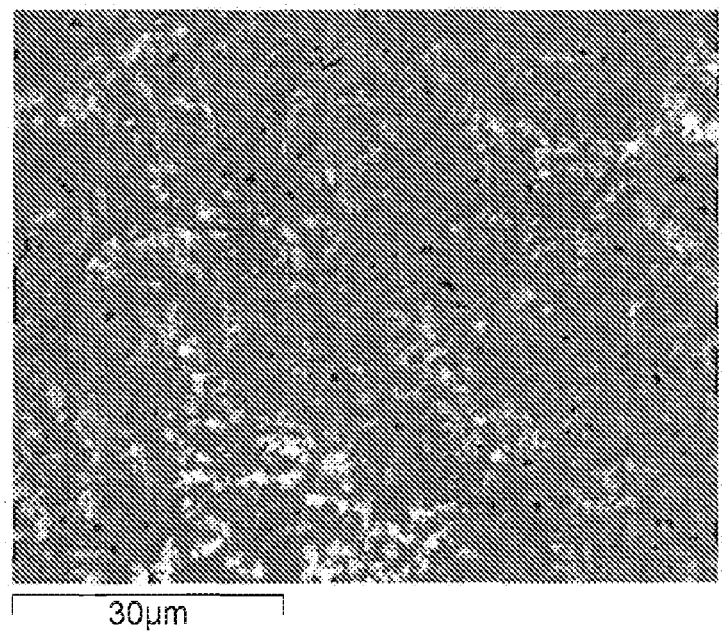
FIG. 4 is a photomicrograph that is a backscatter image taken via scanning electron microscopy (with a scale of 30 micrometers) of the ceramic Batch No. 17667C wherein the white phase is the rare earth alumina silicate grain boundary phase, the medium gray phase are grains of the alpha SiAlON phase, and dark regions comprise the beta SiAlON phase.

FIG. 4 is a photomicrograph that is a backscatter image taken via scanning electron microscopy (with a scale of 30 micrometers) of the ceramic Batch No. 17667C. The white phase is the rare earth alumina silicate grain boundary phase, the medium gray phase are grains of the alpha SiAlON phase, and dark regions comprise the beta SiAlON phase.

Figure 5:
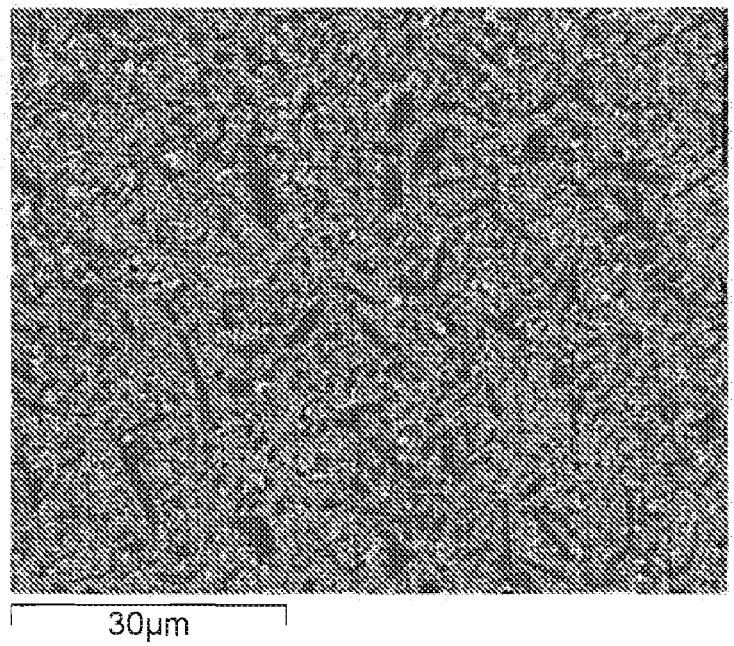
FIG. 5 is a photomicrograph that is a backscatter image taken via scanning electron microscopy (with a scale of 30 micrometers) of the ceramic Batch No. 17667D wherein the white phase is the rare earth alumina silicate grain boundary phase, the medium gray phase are grains of the alpha SiAlON phase, and dark regions comprise the beta SiAlON phase.

FIG. 5 is a photomicrograph that is a backscatter image taken via scanning electron microscopy (with a scale of 30 micrometers) of the ceramic Batch No. 17667D. The white phase is the rare earth alumina silicate grain boundary phase, the medium gray phase are grains of the alpha SiAlON phase, and dark regions comprise the beta SiAlON phase.

Overall, Batches Nos. 17667A and 17667D had essentially the same composition, except that the silicon nitride starting powders had different beta-silicon nitride contents. The UBE silicon nitride powder had about 100 weight percent alpha-silicon nitride and at most about 1 weight percent beta-silicon nitride. The VESTA silicon nitride powder had about 7 weight percent beta-silicon nitride. A comparison between Batch 17667A (which used UBE silicon nitride powder) and Batch No. 17667C (which used VESTA silicon nitride powder) shows that the properties of the consolidated ceramic improve with the use of the low beta silicon nitride powder. For example, Batch No. 17667A contained a greater content of alpha-SiAlON phase (64.4 weight percent) as compared to Batch 17667C (18 weight percent). Batch No. 17667A had a higher Vickers hardness (19.35 GPa) as compared to Batch No. 17667C (16.53 GPa). Further, Batch No. 17667A had a greater $K_{IC}$ fracture toughness (6.83 MPa·m$^{1/2}$) as compared to Batch No. 17667D (6.09 MPa·m$^{1/2}$). As show in Table 7, similar differences in these properties exist between Batch Nos. 17667B and 17667D. These differences demonstrate the improvement in properties for the ceramic using the low beta silicon nitride powder.

Additional inventive examples are set forth as Batches 18695A through 18695C and 19282A.

For each one of Inventive Batch Nos. 18695A through 18695C and 19282A set out in Table 8, the starting powder composition was milled for a time of between about 8 hours and about 16 hours with isopropanol and using an alpha' SiAlON-beta' SiAlON media to form a slurry. After completion of the milling, the slurry was discharged through a 400 mesh screen and then vacuum dried to form a dry powder. The dry powder was then fitzmilled and pellitized using a fluid bed process. Rosin and Carbowax 400 were added as binders during the fluidization process. The pellitized material (dry powder and the binder material) was then dry pressed into green compacts of partial density wherein this density ranged between about 2 to about 2.15 grams per cubic centimeter. The binder was then removed by an air burnout cycle that had a maximum temperature of about 875 degrees Fahrenheit.

TABLE 8

Starting Powder Mixtures (in weight percent of the total starting powder mixture) of Batch Nos. 18695A-18695C and 19282A of SiAlON Ceramic

| Batch No. | Silicon Nitride (UBE) | Aluminum Nitride | Magnesia | Ytterbia |
| --- | --- | --- | --- | --- |
| 18695A | 88.12 | 4.62 | 0.97 | 6.28 |
| 18695B | 87.36 | 5.31 | 0.96 | 6.37 |
| 18695C | 86.61 | 5.98 | 0.96 | 6.46 |
| 19282A | 86.61 | 6.81 | 0.97 | 6.25 |

TABLE 9

Particle Size Properties for the Ball Milled Starting Powder Mixtures (in weight percent) of the Batch Nos. Batch Nos. 18695A-18695C and 19282A of the SiAlON Ceramic

| Batch No. | BET | O2 | PSD 0.1 | PSD 0.5 | PSD 0.9 |
| --- | --- | --- | --- | --- | --- |
| 18695A | 4.76 | 2.06 | 0.44 | 0.8 | 1.40 |
| 18695B | 4.23 | 2.24 | 0.44 | 0.81 | 1.42 |
| 18695C | 4.54 | 2.15 | 0.44 | 0.8 | 1.41 |
| 19282A | 4.42 | 2.38 | 0.36 | 0.72 | 1.30 |

For Table 9, the data set forth therein comprises the following properties: (a) the average surface area of the particles was measured by the BET (Brunauer, Emmet and Teller) method and reported in square meters per gram (m$^2$/gm); (b) the oxygen content of the particles is reported in weight percent of the particle mixture, and is measured via a Leco Oxygen Analyzer; (c) the particle size distribution (i.e., PSD 0.1, PSD 0.5 and PSD 0.9) is reported in microns. It should be appreciated that the particle size data set forth in Table 2 refers to the ball milled components after 16 hours of ball milling.

Samples from Inventive Batches No. 18695A through 18695C and 19282A were sintered via pressure sintering. The pressure sintering cycle comprised placing compacts in a graphite box wherein the compacts were buried in an 80 weight percent silicon nitride-20 weight percent boron nitride powder mixture. The compacts were sintered under a pressure equal to 75 to 100 psi in a nitrogen atmosphere for 60 minutes. The pressure was then increased to 1500 psi using argon gas and soaked (held) for 30 minutes under this pressure (1500 psi). The soak temperature was 1840 C.

Table 10 sets forth the phases present and the physical properties for each of the examples. The Vickers hardness (Hvn) was measured using a 18.5 kilogram load and is set forth in gigapacals (GPa). The fracture toughness ($K_{IC}$) was measured on a polished surface employing a Palmqvist indentation technique using a 18.5 kg load on a Vickers indentor per the article by Evans and Charles, "Fracture Toughness Determination by Indentation", J. American Ceramic Society, Vol. 59, Nos. 7-8, pages 371-372 and reported in MPa·m$^{1/2}$. The Knoop hardness ($H_{kn}$) was measured using a 2 Kg load and reported in kg/mm$^2$. As set forth in Table 3, the weight percent of the alpha prime SiAlON phase and the beta prime SiAlON phase is of the total of the alpha SiAlON phase and the beta SiAlON phase.

TABLE 10

Selected Physical Properties of Ceramic Bodies of Batch Nos.
Batch Nos. 18695A-18695C and 19282A of SiAlON Ceramic

| Batch No. | Percent alpha SiAlON phase | Percent beta SiAlON phase | YbSiAlN* Rel. Intensity of Peak | Vickers Hardness GPa/Std. Dev. | Fracture Toughness ($K_{IC}$) MPa·$m^{1/2}$/Std. Dev. | $H_{kn}$ (2 kg load kg/$mm^2$)/ Std. Dev. | Density (g/cc) |
|---|---|---|---|---|---|---|---|
| 18695A | 77.2 | 22 | 7.9 | 19.66/0.42 | 6.43/0.76 | 1671/18 | 3.314 |
| 18695B | 82 | 17.4 | 4.5 | 20.90/0.61 | 6.76/0.21 | 1705/16 | 3.315 |
| 18695C | 84.5 | 14.5 | 4.0 | 20.76/0.26 | 6.76/0.10 | 1731/22 | 3.313 |
| 19282A | 93.7 | 5.5 | — | 22.33/0.94 | 6.33/0.10 | 1710/11 | 3.31 |

*The formula for this compound is $Yb_4Si_{1.67}Al_{1.3}O_{8.33}N_{.67}$

In regard to the determination of the weight percent of alpha'-SiAlON phase (the term alpha SiAlON phase can be interchangeably with alpha-SiAlON phase herein), the weight percent of the alpha'-SiAlON phase is calculated pursuant to the technique set forth above with respect to the earlier Batches Nos. 18305A through 18305C.

TABLE 11

Z-Values for Batch Nos. Batch Nos. 18695A-18695C and 19282A

| Batch No. | z-value |
|---|---|
| 18695A | 0.26 |
| 18695B | 0.27 |
| 18695C | 0.30 |
| 19282A | 0.34 |

In reference to Table 11, the value of "z" for the beta SiAlON phase was determined using the following formulas as set forth above for the calculation of "z" values expressed in Table 4.

Figure 6:
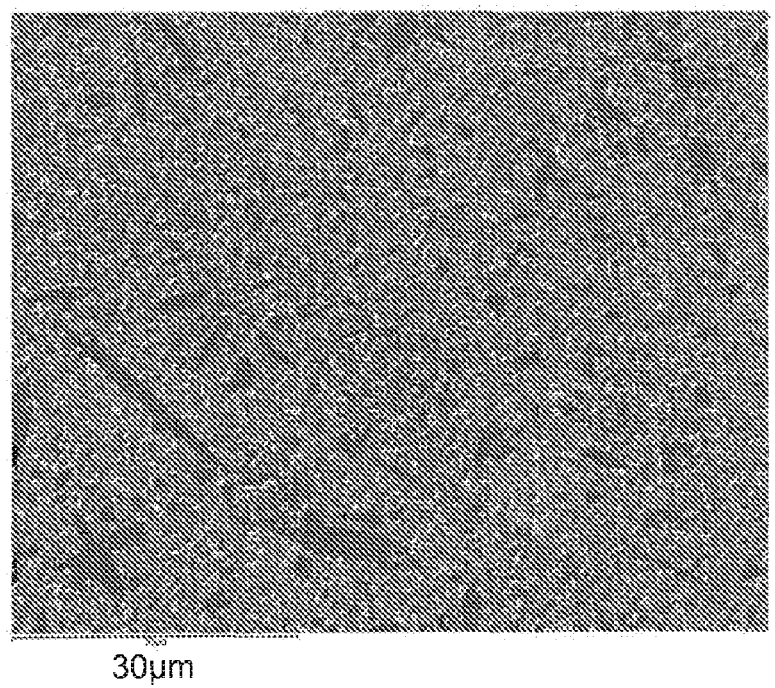
FIG. 6 is a photomicrograph that is a backscatter image taken via scanning electron microscopy (with a scale of 30 micrometers) of the ceramic Batch No. 18695A wherein the white phase is the rare earth alumina silicate grain boundary phase, the medium gray phase are grains of the alpha SiAlON phase, and dark regions comprise the beta SiAlON phase.
Figure 7:
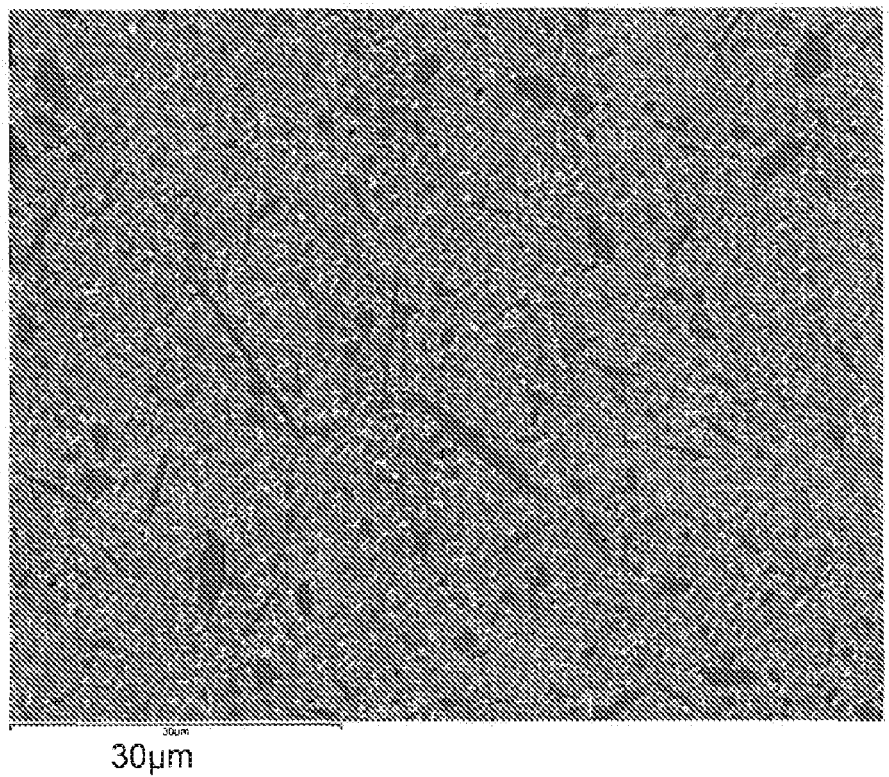
FIG. 7 is a photomicrograph that is a backscatter image taken via scanning electron microscopy (with a scale of 30 micrometers) of the ceramic Batch No. 18695B wherein the white phase is the rare earth alumina silicate grain boundary phase, the medium gray phase are grains of the alpha SiAlON phase, and dark regions comprise the beta SiAlON phase.

FIGS. 6 and 7 are photomicrographs of the Batch Nos. 18695A and 18695B ceramics set forth in Table 10. A discussion of each photomicrograph, along with the results in Table 10, is set forth below. This discussion also takes into account the powder composition of Table 9.

FIG. 6 is a photomicrograph that is a backscatter image taken via scanning electron microscopy (with a scale of 30 micrometers) of the ceramic Batch No. 18695A. The white phase is the rare earth alumina silicate grain boundary phase, the medium gray phase are grains of the alpha SiAlON phase, and dark regions comprise the beta SiAlON phase. Table 10 shows that the z value is equal to 0.26, and that the alpha-SiAlON phase comprises 77.2 weight percent of the sum of the alpha-SiAlON phase and beta-SiAlON phase.

FIG. 7 is a photomicrograph that is a backscatter image taken via scanning electron microscopy (with a scale of 30 micrometers) of the ceramic Batch No. 18695B. The white phase is the rare earth alumina silicate grain boundary phase, the medium gray phase are grains of the alpha SiAlON phase, and dark regions comprise the beta SiAlON phase. Table 10 shows that the z value is equal to 0.27, and that the alpha-SiAlON phase comprises 82 weight percent of the sum of the alpha-SiAlON phase and beta-SiAlON phase.

Overall, the present invention provides an improved armor ceramic material that comprises an alpha SiAlON phase and a beta SiAlON phase, as well as optional other phases. The alpha-beta SiAlON ceramic is an inventive ballistic armor ceramic that satisfies the criteria for ballistic armor materials, as well as addresses drawbacks that exist with current ballistic armor ceramic materials. The present inventive ballistic armor ceramic satisfactorily prevents penetration of projectiles even when traveling at high speeds. This includes the satisfactory prevention of multiple hits of projectiles. To provide properties that allow the ceramic material to resist penetration, the present inventive ballistic armor ceramic exhibits a favorable combination of properties of hardness, fracture toughness and density. This combination of these properties results in the present inventive ballistic armor ceramic that satisfactorily resists penetration of projectiles including multiple hits of projectiles.

The present inventive ballistic armor ceramic has a number of other advantages. First, it is sufficiently lightweight. It is light enough to form a part of a lightweight vehicle and not detract from the vehicle performance. It is light enough for an individual to wear and not impair performance.

In addition, the present inventive ballistic armor ceramic is also affordable to make wherein the affordability of the armor results from one or both of the cost of materials and the cost of manufacture of the inventive ballistic armor ceramic. In this regard, the present inventive ballistic armor ceramic provides the capability for manufacture into more complex shapes or geometries than heretofore available. This would be due to the ability to make the ceramic by methods (e.g., sinter-HIP techniques) that allow for more flexibility than earlier methods (e.g., hot pressing techniques).

The present inventive ballistic armor ceramic also presents a compact design. Such a compact design takes up less space than earlier thicker armor panels, and thus, the present ballistic armor ceramic is very suitable to retrofit existing vehicles.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed:

1. A SiAlON armor ceramic made from a starting powder mixture including silicon nitride powder, the armor ceramic comprising:

a ceramic body comprising between about 64 weight percent and about 90 weight percent alpha SiAlON phase that contains an alpha SiAlON-bound rare earth element wherein the alpha SiAlON-bound rare earth element is the sole rare earth element in the ceramic, and between about 5 weight percent and about 35 weight percent of a beta SiAlON phase of the formula $Si_{6-z}Al_zO_zN_{8-z}$ wherein the value of "z" ranges between about 0.10 and about 0.35;

the alpha SiAlON-bound rare earth element in the alpha SiAlON phase being present as a result of the starting powder mixture containing between about 1 weight percent and about 7 weight percent of an oxide of the alpha SiAlON-bound rare earth element; and the ceramic body having a fracture toughness ($K_{IC}$) greater than about 6.00 Mpa·m$^{1/2}$ and a Vickers hardness ($H_{VN}$) equal to greater than about 19.3 GPa.

2. The SiAlON armor ceramic according to claim 1 wherein the ceramic body comprising between about 80 weight percent and about 90 weight percent of the alpha SiAlON phase, and the fracture toughness ($K_{IC}$) being greater than about 6.20 Mpa·m$^{1/2}$ and the Vickers hardness ($H_{VN}$) being equal to greater than about 20.0 GPa.

3. The SiAlON armor ceramic according to claim 1 wherein the ceramic body comprising between about 64 weight percent and about 82 weight percent of the alpha SiAlON phase, and the fracture toughness ($K_{IC}$) being greater than about 6.20 Mpa·m$^{1/2}$.

4. The SiAlON armor ceramic according to claim 1 wherein the ceramic body comprising between about 78 weight percent and about 82 weight percent of the alpha SiAlON phase, and the fracture toughness ($K_{IC}$) being greater than about 7.00 Mpa·m$^{1/2}$ and the Vickers hardness ($H_{VN}$) being equal to greater than about 20.50 GPa.

5. The SiAlON armor ceramic according to claim 1 wherein the alpha SiAlON-bound rare earth element is selected from the group consisting of ytterbium, yttrium, praseodymium, neodymium, promethium, samarium, europium, gadolinium, terbium, dysprosium, holmium, erbium, thulium, and lutetium.

6. The SiAlON armor ceramic according to claim 1 wherein the ceramic body further comprising sintering aid residue present as a result of the starting powder mixture containing between greater than about 0.1 weight percent and less than or equal to about 2 weight percent of magnesium oxide, and the SiAlON-bound rare earth element selected from the group consisting of yttrium and ytterbium.

7. The SiAlON armor ceramic according to claim 1 wherein the silicon nitride powder in the starting powder mixture comprising greater than or equal to about 97 weight percent alpha phase silicon nitride.

8. The SiAlON armor ceramic according to claim 1 wherein the silicon nitride powder in the starting powder mixture comprising greater than or equal to about 99 weight percent alpha phase silicon nitride.

9. The SiAlON armor ceramic according to claim 1 wherein the "z" value of the beta-SiAlON phase is between about 0.10 and about 0.20.

10. The SiAlON armor ceramic according to claim 1 wherein the "z" value of the beta-SiAlON phase is between about 0.20 and about 0.35.

11. A SiAlON armor ceramic comprising:
a ceramic body comprising an alpha SiAlON phase containing an alpha SiAlON-bound rare earth element wherein the alpha SiAlON-bound rare earth element is the sole rare earth element in the ceramic and a beta SiAlON phase of the formula $Si_{6-z}Al_zO_zN_{8-z}$ wherein the value of "z" ranges between about 0.10 and about 0.35, and the ceramic body being made from a starting powder mixture comprising between about 85 weight percent and about 92 weight percent silicon nitride, between about 3 weight percent and about 8 weight percent aluminum nitride, and between about 1 weight percent and about 7 weight percent of an oxide of the alpha SiAlON-bound rare earth element;

the ceramic body having a fracture toughness ($K_{IC}$) greater than about 6.00 Mpa·m$^{1/2}$ and a Vickers hardness ($H_{VN}$) equal to greater than about 19.3 GPa.

12. The SiAlON armor ceramic according to claim 11 wherein the starting powder mixture further comprising between about 0.1 weight percent and about 2 weight percent of magnesium oxide and the SiAlON-bound rare earth element selected from the group consisting of yttrium and ytterbium.

13. The SiAlON armor ceramic according to claim 11 wherein the silicon nitride powder in the starting powder mixture comprising greater than or equal to about 97 weight percent alpha phase silicon nitride.

14. The SiAlON armor ceramic according to claim 11 wherein the silicon nitride powder in the starting powder mixture comprising greater than or equal to about 99 weight percent alpha phase silicon nitride.

15. The SiAlON armor ceramic according to claim 11 wherein the "z" value of the beta-SiAlON phase is between about 0.10 and about 0.20.

16. The SiAlON armor ceramic according to claim 11 wherein the "z" value of the beta-SiAlON phase is between about 0.20 and about 0.35.

17. The SiAlON armor ceramic according to claim 11 wherein the alpha SiAlON-bound rare earth element is selected from the group consisting of ytterbium, yttrium, praseodymium, neodymium, promethium, samarium, europium, gadolinium, terbium, dysprosium, holmium, erbium, thulium, and lutetium.

* * * * *